United States Patent [19]

Pearce et al.

[11] Patent Number: 4,477,419
[45] Date of Patent: Oct. 16, 1984

[54] PROCESS FOR THE RECOVERY OF $CO_2$ FROM FLUE GASES

[75] Inventors: Roscoe L. Pearce, Lake Jackson; Richard A. Wolcott, Angleton; Charles R. Pauley, Lake Jackson, all of Tex.

[73] Assignee: The Dow Chemical Company, Midland, Mich.

[21] Appl. No.: 471,626

[22] Filed: Mar. 3, 1983

[51] Int. Cl.³ ............................................. B01D 53/34
[52] U.S. Cl. .................................. 423/228; 423/212; 423/229
[58] Field of Search ............... 423/220, 228, 437, 438, 423/229, 212; 55/68, 73

[56] References Cited

U.S. PATENT DOCUMENTS

| | | | |
|---|---|---|---|
| 1,944,122 | 1/1934 | Fife | 423/229 |
| 2,377,966 | 6/1945 | Reed | 423/229 |
| 2,559,580 | 7/1951 | Alexander | 423/228 |
| 2,797,188 | 6/1957 | Taylor, Jr. et al. | 423/228 X |
| 3,568,405 | 3/1971 | Perry | 55/73 X |
| 4,287,161 | 9/1981 | Agrawal | 423/229 |

Primary Examiner—Earl C. Thomas
Attorney, Agent, or Firm—B. G. Colley

[57] ABSTRACT

A method is disclosed for recovering carbon dioxide from gases containing the same as well as oxygen and/or sulfur compounds employing aqueous 5 to 80% alkanolamine solutions. Corrosion of the metals of construction and solvent degradation are minimized by the use of copper ion maintained in solution and continuous removal of ionic iron and solvent degradation products by treating the solvent or a portion of the solvent with a carbon bed, mechanical filter and/or a anion exchange resin.

42 Claims, 1 Drawing Figure

PROCESS FOR THE RECOVERY OF CO₂ FROM FLUE GASES

BACKGROUND OF THE INVENTION

The supply of carbon dioxide from natural sources, by-product $CO_2$ from ammonia manufacture, and hydrogen purification, is not sufficient for the present and future industrial requirements.

The potential supply of $CO_2$ from power plant flue gas could furnish the required amount providing it could be economically recovered. Flue gas normally will be at or near atmospheric pressure and contains about 6-10% $CO_2$ and about 2-5% oxygen. Sulfur dioxide may be an additional contaminant if the fuel source is coal instead of sweet or commercial natural gas.

Most known solvents that can recover $CO_2$ under these conditions will undergo severe solution oxidative degradation and cause corrosion, thus rendering the process uneconomical.

The removal of carbon dioxide from flue gas was practiced in the '50's and early '60's by extracting the carbon dioxide from the combustion products resulting from burning a fuel. In addition inert atmospheres for large annealing furnaces were produced in a like manner.

The principal solvent used in the removal of $CO_2$ from flue gas during this same period employed an aqueous monoethanolamine (MEA) solution in the concentration range of 5-12%. The system was operated until oxidative degradation products and corrosion became sufficiently severe as to warrant discarding the solution with plant cleanup and recharging with fresh solution.

Some processes were improved, vis-a-vis using only the dilute MEA solution until it went bad by operating a side stream reclamation still. Such still removed some of the oxidative degradation products as a bottom product while taking substantially the MEA and water as an overhead product for recycle. The side stream still operated on a 2-3% side stream. This approach was not particularly successful because the degradation products were removed only to a limited extent in the side stream reclaimer. In addition, degradation products continued to be produced at a higher rate due to the high temperatures necessary for operating the reclaimer still.

Another mode of operation of the dilute solution process was the utilization of a 5-8% aqueous MEA solution with a 4-8% concentration of sodium carbonate. Sodium carbonate neutralized degradation products that were acidic in nature (formic acid is the prime oxidation product in this environment). This mode of operation was somewhat successful but like the other two mentioned systems, was unpredictable in the length of time the system would operate before losing capacity to recover $CO_2$.

All the processes mentioned above were extremely energy intensive due to the extremely high circulation rates necessitated by the low concentration of MEA and the very low loadings of $CO_2$ that were permitted in order to minimize corrosion.

The recovery of $CO_2$ from a flue gas using a combustion zone to lower residual oxygen is described in U.S. Pat. No. 4,364,915 dated Dec. 21, 1982.

A mode of operation utilizing copper salts as an inhibitor is disclosed in U.S. Pat. No. 2,377,966, dated June 12, 1945. This method was used in the above mentioned systems that did not include the use of a reclaimer in the operation. Copper was only moderately successful as a corrosion inhibitor even at the low $CO_2$ loadings and low concentrations of alkanolamine. Precipitation of elemental copper was a serious limitation of this process and resulted in enhanced corrosion due to galvanic attack in the peripheral area of the deposited copper metal. This system was operated much the same way that the uninhibited aqueous MEA solution first mentioned was utilized, in that when the system became sufficiently degraded the entire solution was dumped, the internals of the plant cleaned, fresh alkanolamine charged back to the system, and the system put back in service. The length of time the system remained on stream was again unpredictable.

The use of activated carbon or ion exchange resin to remove contaminates from aqueous alkanolamine solutions is known from U.S. Pat. Nos. 1,944,122; 2,797,188; 3,568,405; and 4,287,161. However, these patents do not suggest the suprising results obtained herein using an effective amount of copper salts in the alkanolamine solution in conjunction with the use of activated carbon or ion exchange resin.

SUMMARY OF THE INVENTION

In accordance with the present invention, gas containing carbon dioxide and oxygen is contacted in the conventional manner in a suitable gas-liquid contactor with an alkanolamine solution. The above alkanolamine solution contains an amount of copper effective to inhibit corrosion. The actual amount of copper used can be any amount of copper greater than about 5 parts of copper per million parts of solution wherein the carbon dioxide and, if present, sulfur containing acid gases (e.g. $SO_2$ with trace amounts of other sulfur compounds, $H_2S$, COS, and the like) are absorbed.

Conventionally liquid effluent (rich solvent) is withdrawn from the bottom of the contactor and cross exchanged with solvent which has been heated to release the carbon dioxide and sulfur containing gases (lean solvent). The rich solvent after heat exchange with the lean solvent is delivered to a stripper wherein the rich solvent is contacted with rising vapors from the lower end of the stripper. The liquid in the lower end of the stripper is circulated through a reboiler wherein conventionally it is heated to about 240° to 260° F. (115° to 126.5° C.) and returned to the lower portion of the stripper or reboiler surge tank. A portion of the bottoms drawn off the stripper or reboiler surge tank is then returned to the absorption column.

The present invention involves treating all or a portion of the alkanolamine solution at any temperature, however it typically consists of passing a solution, cool rich or cool lean (conveniently the lean solution after heat exchange with the rich solution from the contactor), into and through a mechanical filter, into and through activated carbon, and into and through a second mechanical filter. Following this treatment, the carbon/filtered treated solution can be passed through an ion exchange resin bed thence to the top of the contactor.

The above procedure surprisingly effectively removes ionic iron and solvent degradation products. This allows sufficient ionic copper in solution to abate corrosion, minimizes the formation of degradation products, and maintains substantially the efficiency of the alkanolamine solution.

It is to be understood that while the above preferred mode of operation includes the activated carbon treatment, mechanical filtration and ion exchange treatment, some improvement, e.g. lower corrosivity and/or degradative quality of solvent, can be achieved if only one of the unit operations is employed in treating the solvent. Thus, under certain operating conditions, activated carbon treatment can remove certain of the degradation products both by adsorption and/or absorption and its inherent filtering effects such as mechanical removal of particulate material to obtain some improvement. It however has been found advantageous to couple mechanical filtration both before and after activated carbon treatment to extend the life of the carbon bed and collect the insoluble iron. Ion exchange treatment may also be employed to remove some of the degradation products, with or without either mechanical filtrations or activated carbon treatment, but the bed must be cleaned more often to avoid plugging with insoluble iron or other solid degradation products. Here again, mechanical filtration is preferred to keep at a low level the insoluble iron and/or solid degradation products from plugging the bed. Likewise, the use of one or both filtration mediums as the only treatment will improve the operation of the process but not to the same degree as operating on the three unit operations, i.e. mechanical filtration, activated carbon treatment, and ion exchange.

BRIEF DESCRIPTION OF THE DRAWINGS

The present invention is illustrated by FIG. 1 which is a schematic diagram of a typical commercial operation showing the association of the contactor 16 with the stripper 74, the activated carbon bed 48, mechanical filters 42 and 44, and ion exchange bed 34.

DETAILED DESCRIPTION OF THE DRAWINGS

Figure 1:
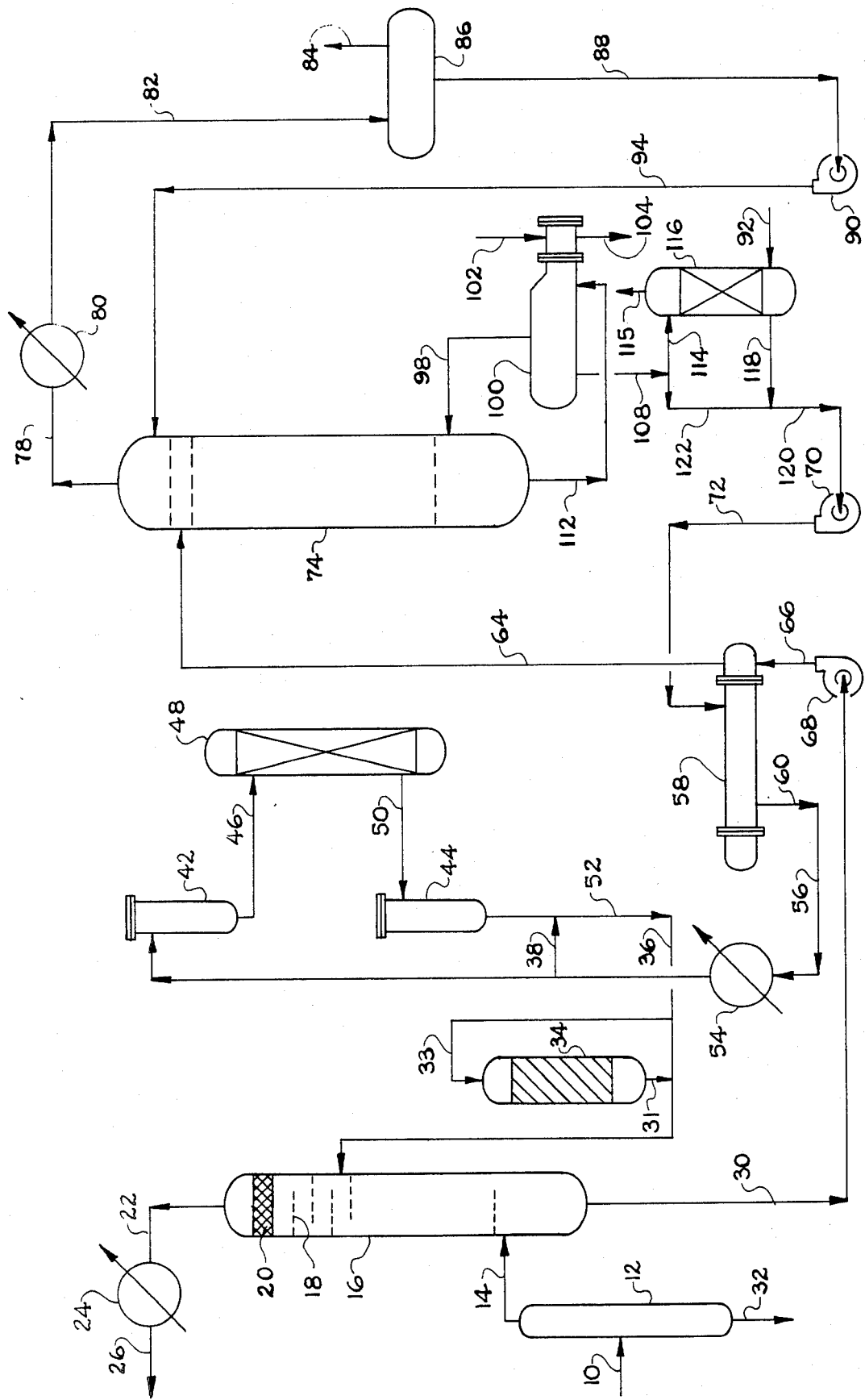

In FIG. 1 of the drawings 10 represents an inlet line for the flue gas or gas from an internal combustion engine to be treated. A knock-out drum 12 with drain line 32 is provided to collect liquid condensates. From the drum 12, line 14 leads the flue gases into absorber 16 which has a plurality of trays 18 and a demister 20.

The effluent gases from the absorber 16 are led by line 22 optionally to a condensor 24 and to outlet line 26.

Recirculating alkanolamine solution is led by line 36 into the absorber 16 and the rich amine solution i.e., amine containing absorbed $CO_2$, leaves the absorber by exit line 30 and thence to the inlet of pump 68. From the pump outlet 66, the rich amine solution flows through the crossexchanger 58 and line 64 to the inlet of the stripper 74 wherein the rich amine is heated and stripped of carbon dioxide. The $CO_2$ is removed by outlet 78 where it flows through a condensor 80 and then by line 82 to a condensate collector 86. The pure $CO_2$ gas is removed by line 84 and the condensate is removed by line 88 for reuse by passing it through a pump 90 and line 94 back to the stripper 74.

At the bottom of the stipper 74, there is provided an outlet line 112 which leads the alkanolamine solution to the inlet of the reboiler 100. The heated solution recirculates back to the stipper by line 98. Steam (here described but other sources of heat may be used) lines 102 and 104 provide an inlet and an outlet for the steam to heat the reboiler 100.

The heated lean alkanolamine solution leaves the reboiler 100 by line 108 where the solution is recirculated by pump 70 and the associated lines 120, 122, and 72 to the heat exchanger 58. A portion of the lean alkanolamine solution can be withdrawn by line 114 and oxidized with an oxygen containing gas such as air in the oxidizing unit 116. Line 118 is provided to return the oxidized solution back to the main line 120. Oxidizing gases are provided by inlet 92 and the used gases are removed by outlet 115.

From the heat exchanger 58, the alkanolamine solution flows by line 56 to an amine cooler 54 and thence by line 40 to a cartridge filter 42 for removal of fine particulates. From the filter 42 the solution goes by line 46 to an activated carbon bed 48 and thence by line 50 to a second cartridge filter 44 for the removal of carbon fines.

Line 52 is provided to lead the solution back to the absorber by line 36. If desired, part or all of the solution can be passed by line 33 to a ion exchange bed 34 having an outlet line 31 for further purification of the solution prior to reuse. It is to be understood that in the above description the necessary valves and controls have not been illustrated in order to clearly point out the invention. It is also understood that some of the solution will by-pass the filtration/purification section through line 38.

DETAILED DESCRIPTION OF THE INVENTION

With a brief description of the unit operations which constitute the present invention, the limits of operating parameters are now set forth.

Inhibitor—The inhibitor of choice for this particular system is ionic copper introduced as any salt soluble in the alkanolamine solution in a concentration greater than about 5 ppm by weight based on the total solution. The preferred soluble salt is copper carbonate. The preferred range is between about 50 ppm and about 750 ppm and the most preferred range is between about 100 ppm and about 500 ppm copper, however it is not implied that greater concentrations of copper are not effective since concentrations in excess of 2000 ppm have been successfully used. It has been shown by both laboratory data and pilot plant data that passivation of the corrosion process can be achieved and maintained even in concentrations less than 50 ppm. Likewise, it has been established that between about 5–80% concentration of MEA can be effectively inhibited against corrosion by maintaining a proper level of copper in the treating solution.

Alkanolamine concentration—from about 5 to about 80 percent solutions of alkanolamine may be employed with reduced corrosion and reduced solvent degradation resulting in improved life of solvent, that is, longer periods between turnarounds or unscheduled down times to replace the solvent. Primary, secondary, and tertiary alkanolamines, or mixtures thereof, may be employed. The preferred alkanolamine being monoethanolamine from about 25 to about 50 percent by weight. It has been found from pilot plant data that the incorporation of the present invention results in little or no downtime occasioned by corrosion and/or necessity to replace the solvent.

Temperature control—It has been found that the reduction of active copper ion content, in for example, monoethanolamine, is greatly accelerated above about 150° F. and that reboiler bulk temperatures of from about 240° F. to about 260° F. and above are conducive to excessive reduction of copper particularly at increased residence times. It is preferable to maintain the reboiler bulk temperature at or below about 240° F. to about 260° F. and more preferably at about 244° F. to about 250° F. Also it is desirable to employ a maximum heat transfer flux of less than about 10,000 BTU and preferably less than about 6,000 BTU per square foot per hour. Higher heat flux and/or residence times will, of course, function but will contribute to a higher rate of copper depletion and thus loss of operability of the overall system.

Contact Pressure—In accordance with the present invention flue gas will be contacted with the alkanolamine at about atmospheric pressure. However, the invention is applicable to higher pressures, limited only by the condensation pressure of the gas mixture being processed.

Mechanical Filter/Activated Carbon Treater—The judicious use of activated carbon coupled with mechanical filtration will remove harmful contaminants resulting from thermal oxidation of alkanolamine, auto-oxidation of alkanolamine, and corrosion of the plant equipment. The activated carbon treaters in conjunction with mechanical filters are utilized for the passage of alkanolamine solution through first a mechanical filter operating in for example the 10–75 micron range, preferably in about the 25–50 micron range for protection of the activated carbon treater which is located immediately downstream. The activated carbon treater will operate to some extent on any of a variety of activated carbons, however it has been found that the most efficient removal for a broad range of degradation products and capacity coupled with longevity of the activated carbon rests with the coal based activated carbons. Allowable bed pressure drop usually determines carbon particle size. A preferred size is in the 12–40 mesh range such as Calgon F-400 or its equivalent.

The carbon treatment removes certain of the degradative products of the alkanolamine which are suspected to be strong iron chelators. Examples of these products are higher molecular weight organic acids. It is reported that these acids are produced from formic acid, generated as a degradation product of the alkanolamines, and oxalic acid which is the further degradation product of formic acid and formates. The primary function of the mechanical filter down stream of the activated carbon bed is to recover insoluble iron and other particulate material that may be released during the activated carbon function. The pore openings may range from about 1 to about 50 microns with the preferred range being between about 5 to about 25 microns. A secondary function is to collect activated carbon fines thus protecting downstream equipment.

To illustrate the significance of adequate solution filtration a pilot plant was operated with and without filtration while measuring the amount of copper and iron in solution. At temperatures sufficient to strip the solution of $CO_2$ and while the solution was being filtered, the concentration of soluble iron was maintained at low enough concentrations to prevent rapid redox with the copper in solution. When the solution was not filtered or when the filter medium, activated carbon, was spent, the soluble iron concentration increased and the soluble copper concentration rapidly decreased until no copper remained in the solution which was followed by the occurrance of corrosion. In the absence of mechanical filtration the carbon itself caught particulate matter and insoluble iron salts which diminished the number of active sites and reduced the overall efficiency of the filtration process. In addition, insoluble iron which was not removed from the system accelerated the rate of soluble iron buildup as the activated carbon began to loose efficiency or become spent. This experiment established the necessity to carbon filter the solution in order to maintain low iron levels and to mechanical filter the solution in order to increase carbon life and minimize the potential for rapid copper redox as the carbon began to loose efficiency.

The solvent stream is activated carbon treated and filtered full flow or as a partial side stream utilizing 0.025 bed volume per minute to 1 bed volume per minute. The preferred rate is 0.1–0.2 bed volume per minute. The present invention likewise has been surprisingly improved by minimizing both activated carbon bed and solvent temperatures to a 150° F. maximum. Operation in this mode improves the capacity and improves the selectivity for particular degradation species. Due to the relatively low temperature requirements for most efficient operation, it is advantageous to place the activated carbon treater and mechanical filters downstream of the amine cooler just prior to introduction of the lean solution to the absorber.

Ion Exchange—Heat stable salts of a number of varieties and from a number of sources are continually produced and/or inadvertently added to alkanolamine systems, especially those processing oxygen containing gas streams. The majority of these salts such as, for example, sodium chloride, amine oxalate, and sodium nitrate are of a type which are not effectively removed by activated carbon and/or mechanical filtration. However, the fact that these salts promote both solvent degradation and inhibitor reduction makes it necessary to remove them from solution. There are two methods of doing this. The known method is solvent reclamation by distillation. This method is not recommended as it depletes the inhibitor level (Cu is not carried over in the distillation process) and unless controlled very carefully can cause increased solvent degradation. The present invention preferably utilizes ion exchange to remove the anionic portion of the heat stable salt. This is accomplished by passage of the contaminated solvent through any of the number of strong base anion exchange resins of the styrenedivinylbenzene type which have a quaternary amine as their functional group, i.e. DOWEX* 1, DOWEX* 2, DOWEX* MSA-1, DOWEX* MSA-2 (*Trademark of The Dow Chemical Company). The anions present in solution displace the hydroxide groups present on the resin and are removed from solution. After the resin is spent (its exchange capacity fully utilized) the resin may be discarded or regenerated with a sodium hydroxide solution of essentially any concentration. The preferred concentration being 2–5N. The regeneration effluent, containing the unwanted salts, is then discarded and the resin ready for reuse.

Exemplary of such ion exchange treatment was the treatment of 100 ml. of a foul 30% MEA solution from the plant which had 300 ppm copper inhibitor and which was carbon treated. The solution was treated by passing it downflow through a 25 ml packed column of DOWEX*1 (OH$^-$form) (*Trademark of The Dow Chemical Company) at 5 cc/min and 78° F. After discarding the hold-up volume of water, the alkanolamine solution was collected and a sample of both the starting material and resin bed effluent were analyzed for heat stable salt content.

| Sample | % Heat Stable Salt |
| --- | --- |
| Starting Solution | 2.4 |
| Resin Effluent | 1.8 |

Net one pass removal 25%

There was substantially no loss of copper as a result of the ion exchange treatment.

Inhibitor Regeneration—Regeneration of inhibitor is not normally required as long as the conditions taught by this invention are followed specifically. However, if by improper plant design or non-adherance to the conditions set forth herein, copper metal or copper compounds are formed by the reduction of the copper, this inhibitor exhibits the surpising capability of regenerability. There can be provided a sidestream withdrawal of a portion of the solution of the bottom of the reboiler, going through an external cooler to drop the temperature of the hot lean alkanolamine containing particulate matter (which contains the reduced inhibitor) down to a temperature less than 150° F., preferably 130° F. or less into a tank or suitable vessel as shown in FIG. 1 in which the solution is aerated with an oxygen-containing gas by a variety of means common to those skilled in the art. The lean solution thus cooled and with the inhibitor regenerated it may be returned back to the lean solution downstream of the heat exchanger or any other advantageous spot in the lean circuit.

We claim:

1. In a process for the recovery of carbon dioxide from feed gases containing the same and oxygen which may also contain sulfur compounds, by contacting the gas with a circulating alkanolamine solution containing copper and treating said solution rich in $CO_2$ with heat to release the $CO_2$ thereby producing a lean solution and returning the so treated lean solution to the contacting step, the improvement which comprises maintaining an amount of copper in said circulating solution effective to inhibit corrosion; and/or degradation of the solvent by contacting the circulating solution with at least one of the following
   (1) at least one mechanical filter;
   (2) activated carbon bed;
   (3) a strong base anion exchange resin; and/or
   (4) any combination thereof.

2. A process of claim 1 wherein the alkanolamine is a monoalkanolamine.

3. A process of claim 1 wherein the alkanolamine is monoethanolamine.

4. The process of claim 1 wherein a portion of the circulating solution is withdrawn and blown with an oxygen containing gas and said portion is returned to the alkanolamine circuit.

5. The process of claim 1 wherein the maximum bulk temperature of the heated alkanolamine is no greater than about 260° F. and is subjected to a heat flux of less than about 10,000 BTU/ft$^2$/hr.

6. The process of claim 1 wherein the bulk temperature of the heated alkanolamine is about 244° to about 250° F. and is subjected to a heat flux of less than about 6000 BTU/ft$^2$/hr.

7. The process of claim 1 wherein the copper ion is maintained at between about 50 ppm and about 750 ppm.

8. The process of claim 1 wherein the copper ion is maintained at between about 100 ppm and about 500 ppm.

9. The process of claim 1 wherein the circulating solution is subjected to treatment by contact with an activated carbon treater thereby to remove one or more of the soluble iron, insoluble iron and solvent degradation products.

10. The process of claim 1 wherein the circulating solution is subjected to treatment by contact with a mechanical filter thereby to remove one or more of the insoluble iron and solvent degradation products.

11. The process of claim 1 wherein the circulating solution is subjected to treatment by contact with a strong base anion exchange resin thereby to remove one or more of the soluble iron, insoluble iron and solvent degradation products.

12. The process of claim 1 wherein the circulating solution is subjected to treatment by contact with a mechanical filter and an activated carbon treater thereby to remove one or more of the soluble iron, insoluble iron and solvent degradation products.

13. The process of claim 1 wherein the circulating solution is subjected to treatment by contact with a mechanical filter and a strong base anion exchange resin thereby to remove one or more of the soluble iron, insoluble iron and solvent degradation products.

14. The process of claim 1 wherein the circulating solution is subjected to treatment by contact with a mechanical filter followed by an activated carbon treater, a second mechanical filter and a strong base anion exchange resin thereby to remove one or more of the soluble iron, insoluble iron and solvent degradation products.

15. The process of claim 1 wherein the feed gas is a flue gas.

16. The process of claim 1 wherein the feed gas is a gas from an internal combustion engine.

17. In a process for the recovery of carbon dioxide from feed gases containing the same and oxygen which may also contain sulfur compounds, by contacting the gas with a circulating alkanolamine solution containing copper and treating said solution rich in $CO_2$ with heat to release the $CO_2$ thereby producing a lean solution and returning the so treated lean solution to the contacting step, the improvement which comprises maintaining at least 5 parts of copper per million parts of solution in said circulating solution;

by contacting the circulating solution with at least one of the following
   (1) at least one mechanical filter;
   (2) activated carbon;
   (3) a strong base anion exchange resin; and/or
   (4) any combination thereof.

18. A process of claim 17 wherein the alkanolamine is a monoalkanolamine.

19. A process of claim 17 wherein the alkanolamine is monoethanolamine.

20. The process of claim 17 wherein a portion of the circulating solution is withdrawn and blown with an oxygen containing gas and such so-treated stream is returned to the alkanolamine circuit.

21. The process of claim 17 wherein the maximum bulk temperature of the heated alkanolamine is no greater than about 260° F. and is subjected to a heat flux of less than about 10,000 BTU/ft$^2$/hr.

22. The process of claim 17 wherein the bulk temperature of the heated alkanolamine is about 244° to about 250° F. and is subjected to a heat flux of less than about 6000 BTU/ft²/hr.

23. The process of claim 17 wherein the copper ion is maintained at between about 50 ppm and 750 ppm.

24. The process of claim 17 wherein the copper ion is maintained at between about 100 ppm and 500 ppm.

25. The process of claim 17 wherein the circulating solution is subjected to treatment by contact with an activated carbon treater thereby to remove one or more of the soluble iron, insoluble iron and solvent degradation products.

26. The process of claim 17 wherein the circulating solution is subjected to treatment by contact with a mechanical filter thereby to remove one or more of the insoluble iron and solvent degradation products.

27. The process of claim 17 wherein the circulating solution is subjected to treatment by contact with a strong base annion exchange bed thereby to remove one or more of the soluble iron, insoluble iron and solvent degradation products.

28. The process of claim 17 wherein the circulating solution is subjected to treatment by contact with a mechanical filter and an activated carbon treater thereby to remove one or more of the soluble iron, insoluble iron and solvent degradation products.

29. The process of claim 17 wherein the circulating solution is subjected to treatment by contact with a mechanical filter and a strong base anion exchange bed thereby to remove one or more of the soluble iron, insoluble iron and solvent degradation products.

30. The process of claim 17 wherein the circulating solution is subjected to treatment by contact with a mechanical filter followed by an activated carbon treater, a second mechanical filter and a strong base anion exchange resin thereby to remove one or more of the soluble iron, insoluble iron and solvent degradation products.

31. The process of claim 17 wherein the feed gas is a flue gas.

32. The process of claim 17 wherein the feed gas is a gas from an internal combustion engine.

33. In a process for the recovery of carbon dioxide from feed gases containing the same and oxygen which may also contain sulfur compounds, by contacting the gas with a circulating aqueous 5 to 80% by weight alkanolamine solution containing copper and treating said solution rich in $CO_2$ with heat to release the $CO_2$ thereby producing a lean solution and returning the so treated lean solution to the contacting step, the improvement which comprises maintaining at least 5 parts of copper per million parts of solution in said circulating solution;
by contacting the circulating solution with at least one of the following
(1) at least one mechanical filter;
(2) activated carbon;
(3) a strong base anion exchange resin; and/or
(4) any combination thereof.

34. In a process for the recovery of carbon dioxide from feed gases containing the same and oxygen which may also contain sulfur compounds, by contacting the gas with a circulating aqueous 5 to 80% by weight alkanolamine solution containing copper and treating said solution rich in $CO_2$ with heat to release the $CO_2$ thereby producing a lean solution and returning the so treated lean solution to the contacting step, the improvement which comprises maintaining about 50 to about 750 parts of copper per million parts of solution in said circulating solution by contacting all or a portion of the circulating solution with the following series of treatments
(1) a first mechanical filter,
(2) an activated carbon bed,
(3) a second mechanical filter, and
(4) optionally, a strong base anion exchange resin bed.

35. The process of claim 34 wherein the alkanolamine is a monoalkanolamine.

36. The process of claim 34 wherein the alkanolamine is monoethanolamine.

37. The process of claim 34 wherein a portion of the circulating solution is withdrawn and blown with an oxygen containing gas and such so-treated stream is returned to the alkanolamine circuit.

38. The process of claim 34 wherein the maximum bulk temperature of the heated alkanolamine is no greater than about 260° F. and is subjected to a heat flux of less than about 10,000 BTU/ft²/hr.

39. The process of claim 34 wherein the bulk temperature of the heated alkanolamine is about 244° to about 250° F. and is subjected to a heat flux of less than about 6000 BTU/ft²/hr.

40. The process of claim 34 wherein the copper ion is maintained at between about 100 ppm and 500 ppm.

41. The process of claim 34 wherein the feed gas is a flue gas.

42. The process of claim 34 wherein the feed gas is a gas from an internal combustion engine.

* * * * *